(No Model.)

F. R. WOODWARD.
EYEGLASSES.

No. 248,079.  Patented Oct. 11, 1881.

WITNESSES:
Francis McArdle.
C. Sedgwick.

INVENTOR:
F. R. Woodward
BY Munn & Co
ATTORNEYS.

UNITED STATES PATENT OFFICE.

FRANK R. WOODWARD, OF HILL, NEW HAMPSHIRE.

EYEGLASS.

SPECIFICATION forming part of Letters Patent No. 248,079, dated October 11, 1881.

Application filed January 29, 1881. (No model.)

*To all whom it may concern:*

Be it known that I, FRANK R. WOODWARD, of Hill, Merrimack county, New Hampshire, have invented a new and Improved Eyeglass, of which the following is a specification.

The object of my invention is to provide an eyeglass in which the lenses move horizontally toward or from each other and do not have the circular motion of the ordinary spring-eyeglass.

The invention consists in two lenses connected by an ordinary eyeglass bow-spring, one of these lenses having a tube attached to the top of its frame and the other having a rod fitting into and sliding in the above tube fastened to its frame, for the purpose of guiding the glasses to move horizontally to and from each other.

Figure 1:
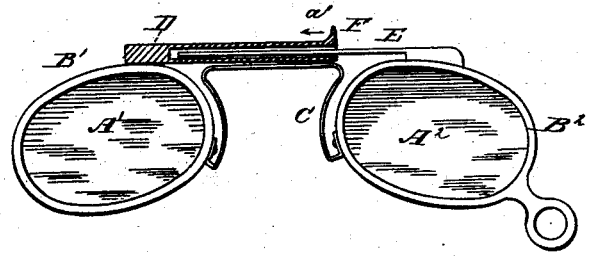
Figure 2:
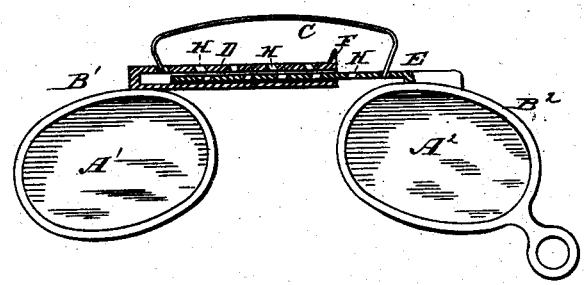
Figure 3:
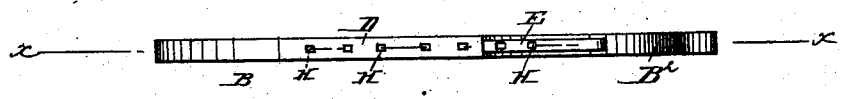
Figure 4:
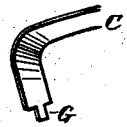

In the accompanying drawings, Figure 1 is a front elevation of my improved eyeglass. Fig. 2 is a front elevation of a modification, showing parts in section. Fig. 3 is a plan view of the same, showing the spring removed. Fig. 4 is a detail perspective view of the end of the spring shown in the modification.

Similar letters of reference indicate corresponding parts.

The frames A' and A² of the lenses B' B² are connected by a bow-spring, C, which is attached to these frames at the adjoining ends of the same, as shown.

A tube, D, of metal, rubber, shell, or some other suitable material, is fastened to the top of the frame A', parallel to this frame, and a rod, E, fitting into this tube D, is attached to the top of the other frame, A². The outer end of the tube D is provided with a slight projection, F. The spring C draws the two frames together, and when the wearer wishes to place the eyeglass on his nose he separates the two frames by pressing on the end of the tube D, thereby moving it in the direction of the arrow *a'*. If the tube is released after the eyeglass has been placed upon the nose, the spring C will draw the frames together, and thus hold the eyeglass on the nose.

Instead of having the spring C rigidly attached to the frames it may be provided at the ends with projections G G, which fit into apertures H H in the top of the tube D and in the rod E. The tension of the spring can thus be adjusted as desired, for if the ends of the spring are separated a considerable distance the tension will be increased. If they are brought nearer together it will be decreased.

This modified eyeglass is placed upon the nose in exactly the same manner as the eyeglass described above. In either case the glasses are separated without twisting or bending the spring, and the glasses are guided in the longitudinal movements by the tube D and rod E.

I am aware that it is not new to have a rod secured to one frame passed through lugs of the other and provided with a spring and adjusting-nut; but

What I claim as new is—

The tube D, attached to eye-frame B', and a rod, E, attached to frame B², in combination with the bow-spring C, as and for the purpose specified.

FRANK R. WOODWARD.

Witnesses:
 OSCAR F. GUNZ,
 C. SEDGWICK.